(12) United States Patent
Ding et al.

(10) Patent No.: US 11,531,107 B2
(45) Date of Patent: Dec. 20, 2022

(54) LONG RANGE LIDAR-BASED SPEED ESTIMATION

(71) Applicant: Volvo Car Corporation, Gothenburg (SE)

(72) Inventors: Sihao Ding, Mountain View, CA (US); Sohini Roy Chowdhury, Santa Clara, CA (US); Minming Zhao, Mountain View, CA (US); Ying Li, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 472 days.

(21) Appl. No.: 16/687,808

(22) Filed: Nov. 19, 2019

(65) Prior Publication Data

US 2021/0149051 A1 May 20, 2021

(51) Int. Cl.
*G01S 17/58* (2006.01)
*G01S 17/931* (2020.01)
*G01S 7/48* (2006.01)
*G06N 3/04* (2006.01)
*G05B 13/02* (2006.01)

(52) U.S. Cl.
CPC ............ *G01S 17/58* (2013.01); *G01S 7/4808* (2013.01); *G01S 17/931* (2020.01); *G05B 13/027* (2013.01); *G06N 3/04* (2013.01)

(58) Field of Classification Search
CPC ...... G01S 17/58; G01S 7/4808; G01S 17/931; G05B 13/027; G06N 3/04
See application file for complete search history.

(56) References Cited

U.S. PATENT DOCUMENTS

| 8,718,916 B2 | 5/2014 | Suzuki |
| 8,988,276 B2 | 3/2015 | Nishigaki et al. |
| 9,905,013 B2 | 2/2018 | Inomata |
| 10,120,079 B2 | 11/2018 | Pennecot et al. |

(Continued)

FOREIGN PATENT DOCUMENTS

WO 2019094843 A1 5/2019

OTHER PUBLICATIONS

Feb. 22, 2021 European Search Report issued in International Application No. 20206109.

*Primary Examiner* — Bryan Bui
(74) *Attorney, Agent, or Firm* — Clements Bernard Walker; Christopher L. Bernard (57) ABSTRACT

A LIDAR-based method of determining an absolute speed of an object at a relatively longer distance from an ego vehicle, including: estimating a self speed of the ego vehicle using a first frame t-1 and a second frame t obtained from a LIDAR sensor by estimating an intervening rotation $\theta$ about a z axis and translation in orthogonal x and y directions using a deep learning algorithm over a relatively closer distance range; dividing each of the first frame t-1 and the second frame t into multiple adjacent input ranges and estimating a relative speed of the object at the relatively longer distance by subsequently processing each frame using a network, with each input range processed using a corresponding convolutional neural network; and combining the estimation of the estimating the self speed with the estimation of the estimating the relative speed to obtain an estimation of the absolute speed.

20 Claims, 4 Drawing Sheets

(56) References Cited

U.S. PATENT DOCUMENTS

| | | |
|---|---|---|
| 10,906,536 B2 * | 2/2021 | Smith ..................... G01S 17/89 |
| 2003/0045991 A1 | 3/2003 | Isogai et al. |
| 2018/0011196 A1 * | 1/2018 | Pennecot ................ G01S 17/87 |
| 2018/0015922 A1 * | 1/2018 | McNew ................ B60W 10/04 |
| 2019/0310650 A1 | 10/2019 | Halder |
| 2019/0315351 A1 | 10/2019 | Smith et al. |

* cited by examiner

LONG RANGE LIDAR-BASED SPEED ESTIMATION

TECHNICAL FIELD

The present disclosure relates generally to the automotive, advanced driver assistance systems (ADAS), and autonomous driving (AD) fields. More particularly, the present disclosure relates to long range LIDAR-based speed estimation systems and methods.

BACKGROUND

The absolute speed of an object in the vicinity of a vehicle is typically based on the determined self speed of the ego vehicle and the relative speed of the object, which may be another vehicle, for example. The self speed is typically determined from an external sensor, such as an inertial measurement unit (IMU), a global positioning system (GPS), or the vehicle odometer, which are known to persons of ordinary skill in the art. However, such sensors are greatly dependent upon other sensors and vehicle operating conditions and can be inaccurate. The relative speed is typically determined from camera images using annotation, object segmentation, and tracking, taking into account past trajectories. However, such object annotation and tracking is difficult when the object is at a long distance from the vehicle, as the object may be hard to detect and the camera can easily lose track of it. The result is error in the absolute speed measurement of surrounding objects, which can significantly impact vehicle safety in ADAS and AD environments.

This, the present disclosure proposes the use of a LIDAR sensor to determine the absolute speed of an object in the vicinity of an ego vehicle. Advantageously, such LIDAR sensors have long range and are less affected by vehicle operating conditions.

SUMMARY

The long range LIDAR-based speed estimation systems and methods of the present disclosure divide multiple LIDAR frames into ranges based on the distance of a point from the LIDAR sensor: short range (e.g. up to 50 or 70 m), middle range (e.g. from 50 or 70 m to 100 or 120 m), and long range (e.g. from 100 or 120 m to 250 m). Given these ranges, tasks are performed separately on each and the results are then combined. Advantageously, the systems and methods of the present disclosure are LIDAR agnostic and run in the 10 Hz region, for example. Two alternative methodologies are provided.

In one exemplary embodiment, the present disclosure provides a LIDAR-based method of determining an absolute speed of an object at a relatively longer distance from an ego vehicle, the method including: estimating a self speed of the ego vehicle using a first frame t-1 and a second frame t obtained from a LIDAR sensor coupled to the ego vehicle by estimating an intervening rotation θ about a z axis and translation in orthogonal x and y directions using a deep learning algorithm over a relatively closer distance range from the ego vehicle; dividing each of the first frame t-1 and the second frame t into three adjacent input ranges and estimating a relative speed of the object at the relatively longer distance by subsequently processing each frame using a network, with each input range processed using a corresponding convolutional neural network; and combining the estimation of the estimating the self speed with the estimation of the estimating the relative speed to obtain an estimation of the absolute speed of the object at the relatively longer distance. The deep learning algorithm is executed by a convolutional neural network. Optionally, the convolutional neural network includes an optical flow estimation network. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

In another exemplary embodiment, the present disclosure provides a LIDAR-based method of determining an absolute speed of an object at a relatively longer distance from an ego vehicle, the method including: receiving a first frame t-1 and a second frame t obtained from a LIDAR sensor coupled to the ego vehicle and dividing each of the first frame t-1 and the second frame t into three adjacent input ranges and processing each frame using a multi-task network, with the input ranges processed using a corresponding convolutional neural network configured to provide intervening rotation θ about a z axis and translation in orthogonal x and y directions to estimate a self speed of the ego vehicle and object location and speed to estimate a relative speed of the object at the relatively longer distance; and combining the estimation of the estimating the self speed with the estimation of the estimating the relative speed to obtain an estimation of the absolute speed of the object at the relatively longer distance. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

In a further exemplary embodiment, the present disclosure provides a non-transitory computer-readable medium stored in a memory and executed by a processor to determine an absolute speed of an object at a relatively longer distance from an ego vehicle via the steps including: estimating a self speed of the ego vehicle using a first frame t-1 and a second frame t obtained from a LIDAR sensor coupled to the ego vehicle by estimating an intervening rotation θ about a z axis and translation in orthogonal x and y directions using a deep learning algorithm over a relatively closer distance range from the ego vehicle; dividing each of the first frame t-1 and the second frame t into three adjacent input ranges and estimating a relative speed of the object at the relatively longer distance by subsequently processing each frame using a network, with each input range processed using a corresponding convolutional neural network; and combining the estimation of the estimating the self speed with the estimation of the estimating the relative speed to obtain an estimation of the absolute speed of the object at the relatively longer distance. The deep learning algorithm is executed by a convolutional neural network. Optionally, the convolutional neural network includes an optical flow estimation network. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

In a still further exemplary embodiment, the present disclosure provides a non-transitory computer-readable medium stored in a memory and executed by a processor to determine an absolute speed of an object at a relatively longer distance from an ego vehicle via the steps including: receiving a first frame t-1 and a second frame t obtained from a LIDAR sensor coupled to the ego vehicle and dividing each of the first frame t-1 and the second frame t into three adjacent input ranges and processing each frame using a multi-task network, with the input ranges processed using a corresponding convolutional neural network configured to provide intervening rotation θ about a z axis and translation in orthogonal x and y directions to estimate a self speed of the ego vehicle and object location and speed to estimate a relative speed of the object at the relatively longer distance; and combining the estimation of the estimating the self speed with the estimation of the estimating the relative speed to obtain an estimation of the absolute speed of the object at the relatively longer distance. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

BRIEF DESCRIPTION OF THE DRAWINGS

The present disclosure is illustrated and described with reference to the various drawings, in which like reference numbers are used to denote like system components/method steps, as appropriate, and in which.

DESCRIPTION OF EMBODIMENTS

The long range LIDAR-based speed estimation systems and methods of the present disclosure divide multiple LIDAR frames into ranges based on the distance of a point from the LIDAR sensor: short range (e.g. up to 50 or 70 m), middle range (e.g. from 50 or 70 m to 100 or 120 m), and long range (e.g. from 100 or 120 m to 250 m). Given these ranges, tasks are performed separately on each and the results are then combined. Advantageously, the systems and methods of the present disclosure are LIDAR agnostic and run in the 10 Hz region, for example. Two alternative methodologies are provided.

In the first alternative methodology, both self-speed estimation and relative speed estimation are performed, with the combined result used to estimate absolute speed. Range affects are considered. Self speed estimation is performed for the short range; a relatively close range, the boundary of which is decided by benchmarking the self speed estimation. Relative speed estimation is performed for all ranges using a range awareness algorithm.

In the second alternative methodology, a multi-task network shares both self speed estimation and relative speed estimation for all ranges. In terms of output, three regression heads produce two types of results: rotation and translation (for self speed estimation) and object location and speed (for relative speed estimation). The rotations, translations, and speeds produced by the multi-task network collectively provide the absolute speed of each object.

Figure 1:
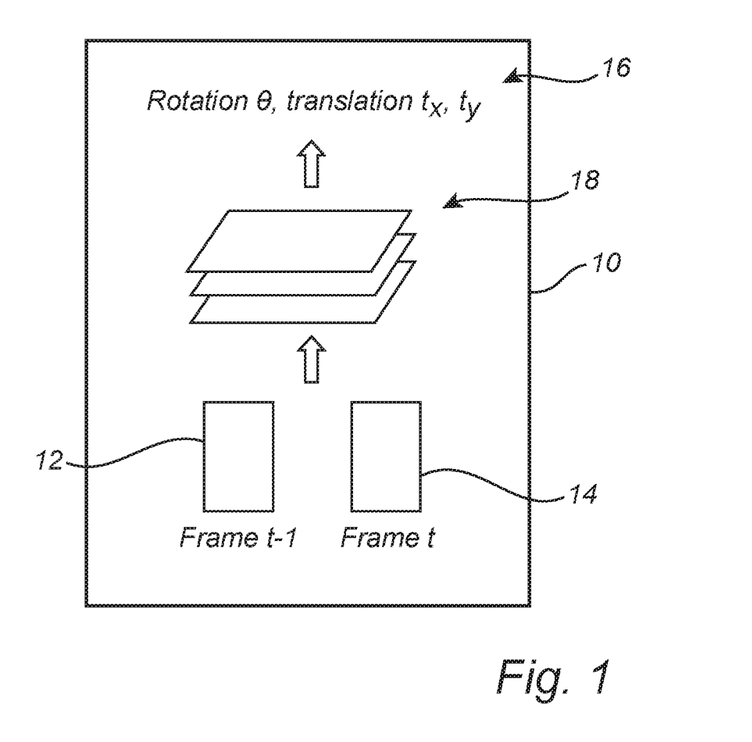
FIG. 1 is a schematic diagram illustrating one exemplary embodiment of the system and method for performing self speed estimation of the present disclosure.

Referring now specifically to FIG. 1, related to the first alternative methodology, for the short range (e.g. up to 50 or 70 m), a network 10 is trained that utilizes successive frames t-1 and t 12,14 for the LIDAR sensor as input. From these successive frames t-1 and t, for each object, the network 10 outputs three parameters 16 via the layers 18 utilized: rotation θ around a z axis and translation along orthogonal x and y axes. From these three parameters, the self speed of the ego vehicle may be estimated.

Here, the network 10 is a deep learning network, or convolutional neural network (CNN), such as an optical flow estimation network. As is known to persons of ordinary skill in the art, a CNN is often applied to analyzing images. CNNs are regularized versions of multilayer perceptrons, or fully connected networks where each neuron in one layer is connected to all neurons in the next layer. They are somewhat prone to overfitting data. Methods for regularization include adding some form of magnitude measurement of weights to the associated loss function. CNNs take advantage of the hierarchical pattern of data and assemble more complex patterns using smaller and simpler patterns. Therefore, CNNs limit connectedness and complexity. CNNs use relatively little pre-processing of data as compared to other image classification algorithms, learning the filters that were hand-engineered in traditional algorithms. A CNN employs a mathematical convolution operation, which is a specialized kind of linear operation. CNNs are simply neural networks that use convolution in place of general matrix multiplication in at least one of their layers. A CNN consists of an input and an output layer, as well as multiple hidden layers. The hidden layers of the CNN typically consist of a series of convolutional layers that convolve with a multiplication or other dot product. The activation function is commonly a RELU layer, and is subsequently followed by additional convolutions, such as pooling layers, fully connected layers, and normalization layers, referred to as hidden layers because their inputs and outputs are masked by the activation function and final convolution. The final convolution often involves backpropagation in order to more accurately weight the end product.

The short range cut-off threshold for self speed estimation is determined via benchmarking. The cut-off threshold should not be too close to the vehicle or there will not be enough captured points to estimate rotation and translation. The cut-off threshold should not be too far from the vehicle or the captured points will be uncertain and sacrifice results.

Figure 2:
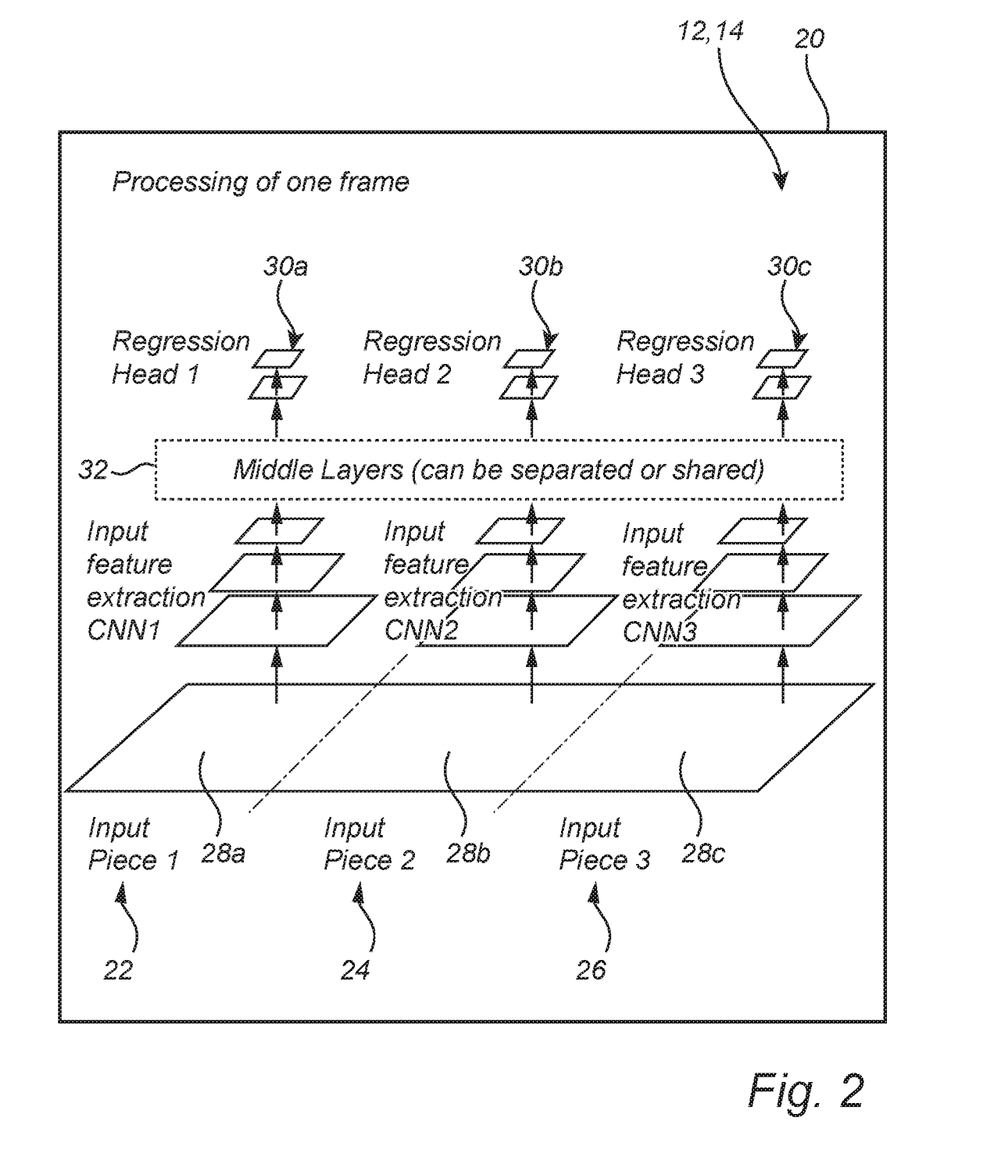
FIG. 2 is a schematic diagram illustrating one exemplary embodiment of the system and method for performing relative speed estimation of the present disclosure.

Referring now specifically to FIG. 2, each of the frames t-1 and t 12,14 is processed using the same network 20 to estimate the relative speed of objects in the vicinity of the vehicle. Each of the short range 22, middle range 24, and long range 26 of each frame 12,14 is processed independently, with a separate feature extraction CNN 28a,28b,28c. The corresponding three regression heads 30a,30b,30c output the relative speed estimations. The middle layers 32 of the CNNs 30a,30b,30c can be shared or separate as between the layers. A hand-over mechanism is utilized to bridge the results of neighboring ranges.

Figure 3:
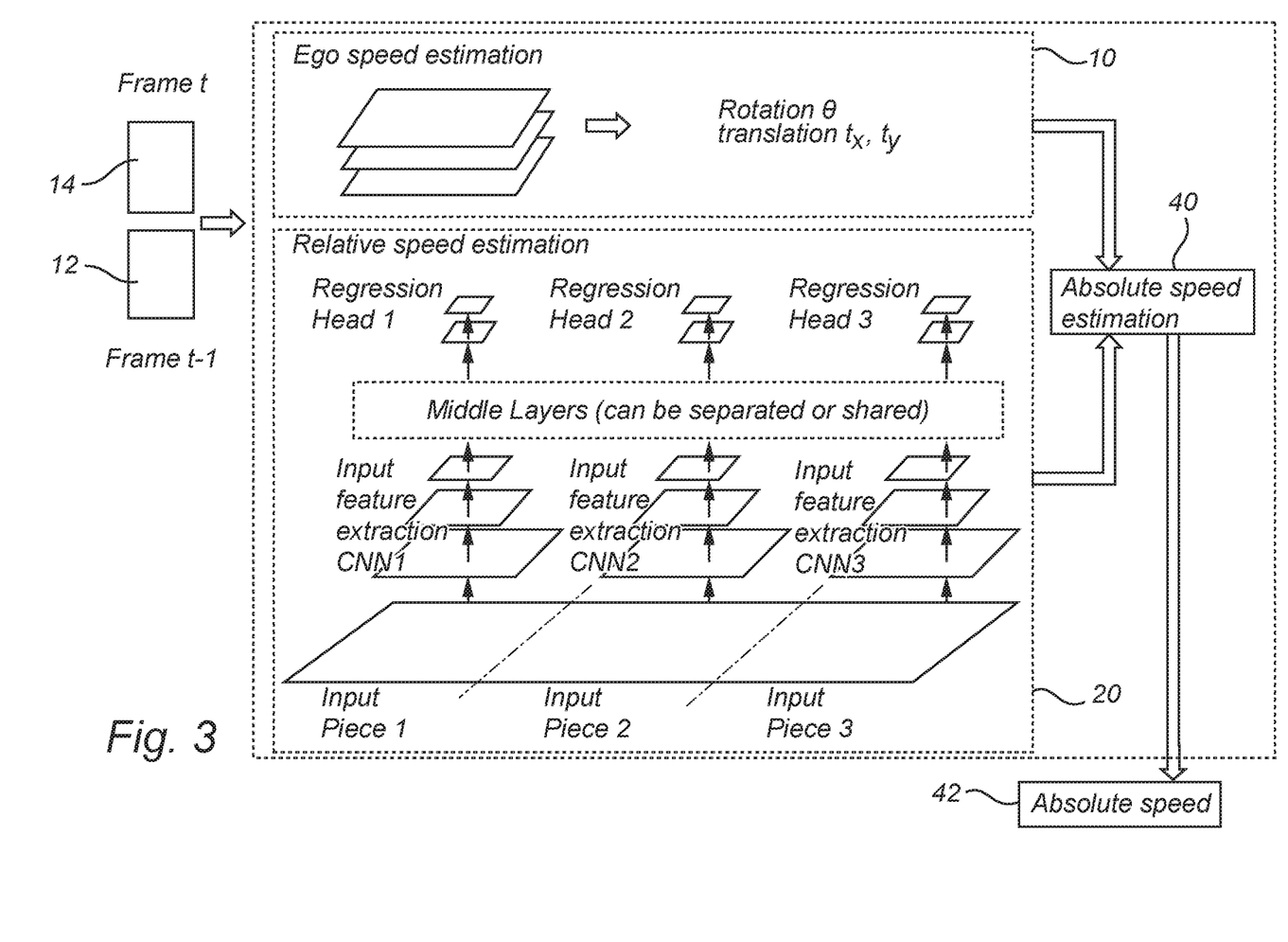
FIG. 3 is a schematic diagram illustrating one exemplary embodiment of the system and method for performing absolute speed estimation and determination of the present disclosure, utilizing the system and method for performing self speed estimation of FIG. 1 and the system and method for performing relative speed estimation of FIG. 2.

Referring now specifically to FIG. 3, the self speed estimation 10 and the relative speed estimations 20 are simply combined to provide absolute speed estimations 40 for all objects detected by the LIDAR sensor in the various ranges. These absolute speed estimations 40 can then be taken as absolute speeds 42.

Figure 4:
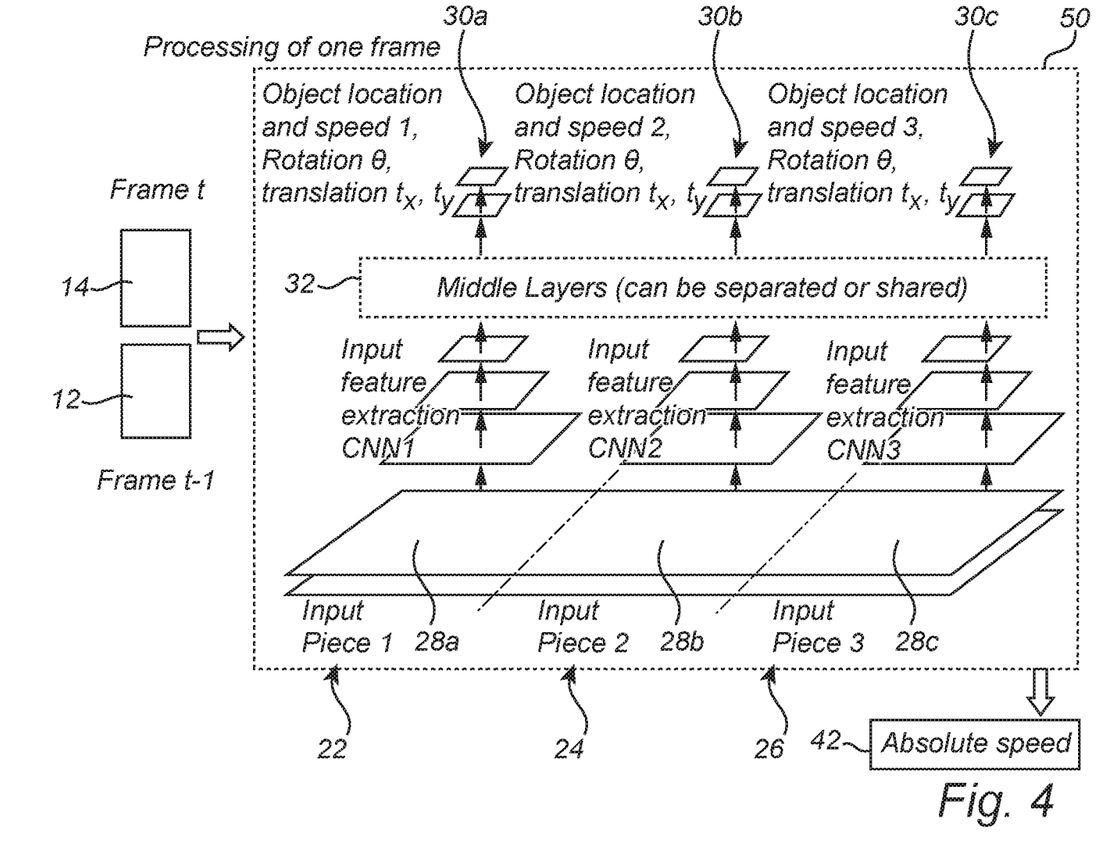
FIG. 4 is a schematic diagram illustrating another exemplary embodiment of the system and method for performing absolute speed estimation and determination of the present disclosure.

Referring now specifically to FIG. 4, related to the second alternative methodology, each of the frames t-1 and frame t 12,14 are again processed using the same network 50 to estimate both the self speed of the ego vehicle and the relative speed of objects in the vicinity of the ego vehicle. Thus, here, the network 50 is a multi-task network. Each of the short range 22, middle range 24, and long range 26 of each frame 12,14 is again processed independently, with a separate feature extraction CNN 28a,28b,28c. The corresponding three regression heads 30a,30b,30c output the object locations and speeds, as well as the rotations and translations, as opposed to simply the relative speed estimations. The middle layers 32 of the CNNs 30a,30b,30c can again be shared or separate. A hand-over mechanism is utilized to bridge the results of neighboring ranges. The resulting absolute speed estimations are taken as absolute speeds 42.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to tangible media, such as data storage media, or communication media, including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The long range LIDAR-based speed estimation systems and methods of the present disclosure divide multiple LIDAR frames into ranges based on the distance of a point from the LIDAR sensor: short range (e.g. up to 50 or 70 m), middle range (e.g. from 50 or 70 m to 100 or 120 m), and long range (e.g. from 100 or 120 m to 250 m). Given these ranges, tasks are performed separately on each and the results are then combined. Advantageously, the systems and methods of the present disclosure are LIDAR agnostic and run in the 10 Hz region, for example. Two alternative methodologies are provided.

In the first alternative methodology, both self-speed estimation and relative speed estimation are performed, with the combined result used to estimate absolute speed. Range affects are considered. Self speed estimation is performed for the short range, Relative speed estimation is performed for all ranges using a range awareness algorithm.

In the second alternative methodology, a multi-task network shares both self speed estimation and relative speed estimation for all ranges. In terms of output, three regression heads produce two types of results: rotation and translation (for self speed estimation) and object location and speed (for relative speed estimation). The rotations, translations, and speeds produced by the multi-task network collectively provide the absolute speed of each object.

Thus, the present disclosure provides a LIDAR-based method of determining an absolute speed of an object at a relatively longer distance from an ego vehicle, the method including: estimating a self speed of the ego vehicle using a first frame t-1 and a second frame t obtained from a LIDAR sensor coupled to the ego vehicle by estimating an intervening rotation θ about a z axis and translation in orthogonal x and y directions using a deep learning algorithm over a relatively closer distance range from the ego vehicle; dividing each of the first frame t-1 and the second frame t into three adjacent input ranges and estimating a relative speed of the object at the relatively longer distance by subsequently processing each frame using a network, with each input range processed using a corresponding convolutional neural network; and combining the estimation of the estimating the self speed with the estimation of the estimating the relative speed to obtain an estimation of the absolute speed of the object at the relatively longer distance. The deep learning algorithm is executed by a convolutional neural network. Optionally, the convolutional neural network includes an optical flow estimation network. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

The present disclosure also provides a LIDAR-based method of determining an absolute speed of an object at a relatively longer distance from an ego vehicle, the method including: receiving a first frame t-1 and a second frame t obtained from a LIDAR sensor coupled to the ego vehicle and dividing each of the first frame t-1 and the second frame t into three adjacent input ranges and processing each frame using a multi-task network, with the input ranges processed using a corresponding convolutional neural network configured to provide intervening rotation θ about a z axis and translation in orthogonal x and y directions to estimate a self speed of the ego vehicle and object location and speed to estimate a relative speed of the object at the relatively longer distance; and combining the estimation of the estimating the self speed with the estimation of the estimating the relative speed to obtain an estimation of the absolute speed of the object at the relatively longer distance. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

The present disclosure further provides a non-transitory computer-readable medium stored in a memory and executed by a processor to determine an absolute speed of an object at a relatively longer distance from an ego vehicle via the steps including: estimating a self speed of the ego vehicle using a first frame t-1 and a second frame t obtained from a LIDAR sensor coupled to the ego vehicle by estimating an intervening rotation θ about a z axis and translation in orthogonal x and y directions using a deep learning algorithm over a relatively closer distance range from the ego vehicle; dividing each of the first frame t-1 and the second frame t into three adjacent input ranges and estimating a relative speed of the object at the relatively longer distance by subsequently processing each frame using a network, with each input range processed using a corresponding convolutional neural network; and combining the estimation of the estimating the self speed with the estimation of the estimating the relative speed to obtain an estimation of the absolute speed of the object at the relatively longer distance. The deep learning algorithm is executed by a convolutional neural network. Optionally, the convolutional neural network includes an optical flow estimation network. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

The present disclosure still further provides a non-transitory computer-readable medium stored in a memory and executed by a processor to determine an absolute speed of an object at a relatively longer distance from an ego vehicle via the steps including: receiving a first frame t-1 and a second frame t obtained from a LIDAR sensor coupled to the ego vehicle and dividing each of the first frame t-1 and the second frame t into three adjacent input ranges and processing each frame using a multi-task network, with the input ranges processed using a corresponding convolutional neural network configured to provide intervening rotation θ about a z axis and translation in orthogonal x and y directions to estimate a self speed of the ego vehicle and object location and speed to estimate a relative speed of the object at the relatively longer distance; and combining the estimation of the estimating the self speed with the estimation of the estimating the relative speed to obtain an estimation of the absolute speed of the object at the relatively longer distance. The relatively shorter distance is separated from the relatively longer distance by a threshold determined via benchmarking to find ranges that provide enough shorter distance points to estimate rotation and translation and close enough longer distance points to provide adequate computation certainty. Each of the convolutional neural networks performs independent input feature extraction and utilizes a separate regression head, but utilizes one of a separate middle layer and a shared middle layer. A hand-over mechanism is employed to bridge results between the three adjacent input ranges.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A LIDAR-based method of determining an absolute speed of an object at a relatively longer distance from an ego vehicle defined as being farther from the ego vehicle than a defined relatively shorter distance range from the ego vehicle, the method comprising:
    estimating a self speed of the ego vehicle using a first frame t-1 and a second frame t obtained from a LIDAR sensor coupled to the ego vehicle by estimating an intervening rotation θ about a z axis and translation in orthogonal x and y directions using a deep learning algorithm over the relatively shorter distance range from the ego vehicle;
    dividing each of the first frame t-1 and the second frame t into multiple adjacent input ranges and estimating a relative speed of the object at the relatively longer distance by subsequently processing each frame using a network, with each input range processed using a corresponding convolutional neural network; and
    combining the estimation of the estimating the self speed with the estimation of the estimating the relative speed to obtain an estimation of the absolute speed of the object at the relatively longer distance.

2. The method of claim 1, wherein the deep learning algorithm is executed by a convolutional neural network.

3. The method of claim 2, wherein the convolutional neural network comprises an optical flow estimation network.

4. The method of claim 1, wherein the relatively shorter distance range is separated from the relatively longer distance by a threshold determined via benchmarking to find a range that provides enough shorter distance points to estimate rotation and translation and close enough longer distance points to provide adequate computation certainty.

5. The method of claim 1, wherein each of the convolutional neural networks performs independent input feature extraction and utilizes a separate regression head, but utilizes one of a separate middle layer and a shared middle layer.

6. The method of claim 1, wherein a hand-over mechanism is employed to bridge results between the multiple adjacent input ranges.

7. A LIDAR-based method of determining an absolute speed of an object at a relatively longer distance from an ego vehicle defined as being farther from the ego vehicle than a defined relatively shorter distance range from the ego vehicle, the method comprising:
    receiving a first frame t-1 and a second frame t obtained from a LIDAR sensor coupled to the ego vehicle and dividing each of the first frame t-1 and the second frame t into multiple adjacent input ranges and processing each frame using a multi-task network, with the input ranges processed using a corresponding convolutional neural network configured to provide intervening rotation θ about a z axis and translation in orthogonal x and y directions over the relatively shorter distance range from the ego vehicle to estimate a self speed of the ego vehicle and to estimate a relative speed of the object at the relatively longer distance by processing each frame over the multiple adjacent input ranges; and
    combining the estimation of the estimating the self speed with the estimation of the estimating the relative speed to obtain an estimation of the absolute speed of the object at the relatively longer distance.

8. The method of claim 7, wherein the relatively shorter distance range is separated from the relatively longer distance by a threshold determined via benchmarking to find a range that provides enough shorter distance points to estimate rotation and translation and close enough longer distance points to provide adequate computation certainty.

9. The method of claim 7, wherein each of the convolutional neural networks performs independent input feature extraction and utilizes a separate regression head, but utilizes one of a separate middle layer and a shared middle layer.

10. The method of claim 7, wherein a hand-over mechanism is employed to bridge results between the multiple adjacent input ranges.

11. A non-transitory computer-readable medium stored in a memory and executed by a processor to determine an absolute speed of an object at a relatively longer distance from an ego vehicle defined as being farther from the ego vehicle than a defined relatively shorter distance range from the ego vehicle via the steps comprising:
    estimating a self speed of the ego vehicle using a first frame t-1 and a second frame t obtained from a LIDAR sensor coupled to the ego vehicle by estimating an intervening rotation θ about a z axis and translation in orthogonal x and y directions using a deep learning algorithm over the relatively shorter distance range from the ego vehicle;
    dividing each of the first frame t-1 and the second frame t into multiple adjacent input ranges and estimating a relative speed of the object at the relatively longer distance by subsequently processing each frame using a network, with each input range processed using a corresponding convolutional neural network; and
    combining the estimation of the estimating the self speed with the estimation of the estimating the relative speed to obtain an estimation of the absolute speed of the object at the relatively longer distance.

12. The non-transitory computer-readable medium of claim 11, wherein the deep learning algorithm is executed by a convolutional neural network.

13. The non-transitory computer-readable medium of claim 12, wherein the convolutional neural network comprises an optical flow estimation network.

14. The non-transitory computer-readable medium of claim 11, wherein the relatively shorter distance range is separated from the relatively longer distance by a threshold determined via benchmarking to find a range that provides enough shorter distance points to estimate rotation and translation and close enough longer distance points to provide adequate computation certainty.

15. The non-transitory computer-readable medium of claim 11, wherein each of the convolutional neural networks performs independent input feature extraction and utilizes a separate regression head, but utilizes one of a separate middle layer and a shared middle layer.

16. The non-transitory computer-readable medium of claim 11, wherein a hand-over mechanism is employed to bridge results between the multiple adjacent input ranges.

17. A non-transitory computer-readable medium stored in a memory and executed by a processor to determine an absolute speed of an object at a relatively longer distance from an ego vehicle defined as being farther from the ego vehicle than a defined relatively shorter distance range from the ego vehicle via the steps comprising:

receiving a first frame t-1 and a second frame t obtained from a LIDAR sensor coupled to the ego vehicle and dividing each of the first frame t-1 and the second frame t into multiple adjacent input ranges and processing each frame using a multi-task network, with the input ranges processed using a corresponding convolutional neural network configured to provide intervening rotation $\theta$ about a z axis and translation in orthogonal x and y directions over the relatively shorter distance range from the ego vehicle to estimate a self speed of the ego vehicle and to estimate a relative speed of the object at the relatively longer distance by processing each frame over the multiple adjacent input ranges; and combining the estimation of the estimating the self speed with the estimation of the estimating the relative speed to obtain an estimation of the absolute speed of the object at the relatively longer distance.

18. The non-transitory computer-readable medium of claim 17, wherein the relatively shorter distance range is separated from the relatively longer distance by a threshold determined via benchmarking to find a range that provides enough shorter distance points to estimate rotation and translation and close enough longer distance points to provide adequate computation certainty.

19. The non-transitory computer-readable medium of claim 17, wherein each of the convolutional neural networks performs independent input feature extraction and utilizes a separate regression head, but utilizes one of a separate middle layer and a shared middle layer.

20. The non-transitory computer-readable medium of claim 17, wherein a hand-over mechanism is employed to bridge results between the multiple adjacent input ranges.

* * * * *